United States Patent
Hagen

(10) Patent No.: US 9,422,805 B2
(45) Date of Patent: Aug. 23, 2016

(54) PRESSURE SENSING DEVICE AND METHOD FOR USING THE SAME

(71) Applicant: Innovar Engineering AS, Sola (NO)

(72) Inventor: Karluf Hagen, Randaberg (NO)

(73) Assignee: Innovar Engineering AS, Sola (NO)

( * ) Notice: Subject to any disclaimer, the term of this patent is extended or adjusted under 35 U.S.C. 154(b) by 102 days.

(21) Appl. No.: 14/380,874

(22) PCT Filed: Jun. 18, 2013

(86) PCT No.: PCT/NO2013/050109
§ 371 (c)(1),
(2) Date: Aug. 25, 2014

(87) PCT Pub. No.: WO2013/191561
PCT Pub. Date: Dec. 27, 2013

(65) Prior Publication Data
US 2015/0096363 A1 Apr. 9, 2015

(30) Foreign Application Priority Data
Jun. 22, 2012 (NO) .................................. 20120726

(51) Int. Cl.
G01L 27/00 (2006.01)
G01L 7/16 (2006.01)
E21B 47/06 (2012.01)
E21B 47/16 (2006.01)
G01L 19/12 (2006.01)
E21B 33/134 (2006.01)

(52) U.S. Cl.
CPC .............. *E21B 47/06* (2013.01); *E21B 33/134* (2013.01); *E21B 47/16* (2013.01); *G01L 7/166* (2013.01); *G01L 19/12* (2013.01); *G01L 27/007* (2013.01)

(58) Field of Classification Search
CPC ......... G01L 19/12; G01L 19/10; G01L 7/166; G01L 7/163; G01L 27/007
See application file for complete search history.

(56) References Cited

U.S. PATENT DOCUMENTS

| 3,732,728 | A | 5/1973 | Fitzpatrick |
| 4,651,670 | A | 3/1987 | Silverwater |
| 4,729,339 | A * | 3/1988 | Whiting .............. B01D 35/143 116/267 |
| 4,992,997 | A | 2/1991 | Bseisu |
| 5,458,200 | A | 10/1995 | Lagerlef et al. |
| 5,914,911 | A | 6/1999 | Babour et al. |
| 7,337,854 | B2 * | 3/2008 | Horn ..................... E21B 43/121 166/105 |
| 8,429,980 | B2 * | 4/2013 | Feldmeier .......... G01L 19/0023 73/744 |
| 2003/0154797 | A1 | 8/2003 | Helliker et al. |
| 2007/0062297 | A1 * | 3/2007 | Feldmeier ................ G01L 7/16 73/744 |
| 2011/0164468 | A1 | 7/2011 | Robbins et al. |

FOREIGN PATENT DOCUMENTS

SU 1569633 A * 6/1990

OTHER PUBLICATIONS

International Search Report and Written Opinion for PCT/NO2013/050109 dated Nov. 18, 2013.
International Preliminary Report on Patentability dated May 7, 2014.
Response to Written Opinion for PCT/NO2013/050109 dated Apr. 16, 2014.

* cited by examiner

*Primary Examiner* — David A Rogers
(74) *Attorney, Agent, or Firm* — Andrus Intellectual Property Law, LLP

(57) ABSTRACT

A pressure-sensing device is for use in an underground well. The pressure-sensing device includes a pressure sensor arranged at least to sense whether a pressure in the well is below or above a given limit value, and a signal generator arranged to generate an acoustic signal in a well body in the well in response to a sensed pressure from the pressure sensor exceeding said limit value. A method is for measuring pressure in an underground well. A use of a pressure-sensing device is to monitor the pressure between two spaced-apart barrier elements in an underground well.

6 Claims, 4 Drawing Sheets

PRESSURE SENSING DEVICE AND METHOD FOR USING THE SAME

CROSS-REFERENCE TO RELATED APPLICATIONS

This application is the U.S. national stage application of International Application PCT/NO2013/050109, filed Jun. 18, 2013, which international application was published on Dec. 27, 2013, as International Publication WO2013/191561 in the English language. The international application is incorporated herein by reference, in entirety. The international application claims priority to Norwegian Patent Application No. 20120726, which is incorporated herein by reference.

FIELD

The invention relates to a pressure-sensing device for use in an underground well. More specifically, the invention relates to a pressure-sensing device generating an acoustic signal in a well body in response to the pressure in the well exceeding a set limit value. The invention also relates to a method of using the pressure-sensing device.

BACKGROUND

When preparing and completing an underground well, for example of the kind used in the recovery of petroleum, strict safety requirements are imposed on those in charge. It is important to protect personnel, the surrounding environment and the drilling and production equipment from the formations being operated in. Large pressure and temperature differences may make the work on the well challenging. Well barriers are loops with one or more cooperating well-barrier elements which prevent fluids from undesirably flowing from the formation, either into another formation or up to the surface. According to the NORSOK standard D-010 ("Well integrity in drilling and well operations"), one barrier loop is required in a well in which there is a risk of uncontrolled cross flows between the formation zones of the well, whereas two barrier loops are required in wells in which there is a risk of uncontrolled blowouts from the well into the surroundings. Intact barrier loops are a condition for the work to be carried out in accordance with the standard and with no or minimal risk of undesired events. Various forms of plugs may be important well-barrier elements in both primary and secondary barrier loops. In practice, two spaced-apart plugs are often established in the well. It is desirable, and in several countries required by law, to monitor the integrity of both plugs. In practice, only the pressure above the upper plug is monitored, so that an undesired pressure increase in the space between the two plugs, owing to a failure of the lower plug, will not be picked up. So, a barrier element may have been lost without this being shown on the surface. Often, barrier plugs will be installed because work above the upper plug in the well has been planned. Getting components installed that can monitor the pressure between the two barrier plugs may therefore be challenging. Using equipment, for example cable glands, that may affect the functionality of the upper barrier plug is not desirable either.

SUMMARY

The invention has for its object to remedy or reduce at least one of the drawbacks of the prior art or at least provide a useful alternative to the prior art.

The object is achieved through features which are specified in the description below and in the claims that follow.

In a first aspect, the invention relates to a pressure-sensing device for use in an underground well, characterized by the pressure-sensing device including:
- a pressure sensor arranged at least to sense whether a pressure in the well is below or above a given limit value; and
- a signal generator arranged to generate an acoustic signal in a well body in the well in response to the pressure sensed by the pressure sensor exceeding said limit value.

The well body may be a pipe body, for example a steel pipe extending up to the top of the wellbore, or the well body may be a component attached, directly or indirectly, to the pipe body. Acoustic signals propagate at great speed in steel and other metals and metal alloys, and by using a pipe body extending all the way up to the top of the wellbore, the acoustic signal could be transported out of the well without the need of wires, cables and the like.

In one embodiment, the pressure-sensing device may further include a sensor arranged to sense acoustic signals, and the sensor is connected to a control unit including an acoustic signal converter. The sensor could be attached at the upper portion of a pipe body at the top of the wellbore, but the positioning is not limited to this. The sensor may further be connected to a control unit including an acoustic signal converter arranged to convert the acoustic signals into readable data. The sensor may be connected to the control unit by means of communication methods known per se, whether by way of wires/cables or in a wireless manner.

In one embodiment, the signal generator may be a percussion device. The percussion device may be used to generate the acoustic signal by means of knocking against said well body. A relatively simple mechanical device could thereby be used to generate the acoustic signal.

In one embodiment, the device may include a negative-pressure chamber in which the signal generator is placed, the negative-pressure chamber being isolated, in terms of fluid, from the well when the pressure sensor senses a pressure below said limit value. This will have the advantage of allowing the signal generator to be kept separate from the rest of the well. In addition, a pressure difference may be maintained between the negative-pressure chamber and the rest of the well. By a negative-pressure chamber is meant a chamber which is at a negative pressure relative to the surrounding well. The negative-pressure chamber may, for example, be under vacuum or atmospheric pressure.

In a first embodiment, the pressure sensor may be a mechanical pressure sensor arranged to break when the pressure in the well exceeds said limit value. The mechanical pressure sensor may, for example, be a shear pin. The shear pin will make a very simple mechanical pressure sensor without the need for power supply or connection to other remote components. By the shear pin breaking as the pressure in the well exceeds the limit value, the negative-pressure chamber could be put into fluid communication with the surrounding well. The pressure sensor may also be a pressure-sensitive membrane arranged to break at said limit value. The advantages are the same as for the shear pin. Alternatively, a pressure-sensitive valve could be used as well, for example a pressure-relief valve which is tripped at said limit value.

In a second embodiment, the pressure sensor may be an electric pressure sensor, that is to say a pressure sensor which converts sensed pressure into an electric signal. This could be operated, for example, by means of a battery unit or a downhole generator. The battery unit or the generator may also be used to drive the signal generator to generate the acoustic signal in response to the pressure sensor's sensing a pressure exceeding said limit value.

In one embodiment, the negative-pressure chamber may include a piston arranged to be released when the pressure sensor senses a pressure above said limit value, the piston, when released, being set in motion by the pressure difference between the well and the negative-pressure chamber. The piston can then be used to influence the signal generator to generate the acoustic signal. It may be done, for example, by the above-mentioned mechanical pressure sensor, which may be a shear pin, being in engagement with the piston at a sensed pressure below said limit value. By the piston being subjected to a pressure above said limit value, the mechanical pressure sensor breaks and the piston is released. The piston, which is now free to move, is driven upwards in the negative-pressure chamber because of the pressure difference between the well and the negative-pressure chamber. The piston can thus be used to drive the signal generator, which may be a percussion device, to generate the acoustic signal, for example by a percussion device hammering against a well body. In other embodiments, the same pressure difference will be used to generate an acoustic signal without hammering, for example by the fluid flow generating an acoustic signal via a whistle-/horn-like instrument.

In a second aspect, the invention relates to a method for measuring pressure in an underground well, characterized by the method including the following steps:
 by means of a pressure sensor, sensing whether a pressure in the well is below or above a set limit value;
 by means of a signal generator, generating an acoustic signal in a well body in the well in response to the sensed pressure exceeding said limit value.

In one embodiment, the method may further include reading the generated acoustic signal by means of a sensor connected to a control unit including an acoustic signal converter.

In a third aspect, the invention relates to the use of a pressure-sensing device according to the above description to monitor the pressure between two spaced-apart barrier elements in an underground well.

An underground well including a pressure-sensing device in accordance with the above description is described as well.

Finally, a barrier element for an underground well provided with a pressure-sensing device in accordance with the above description is described as well.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
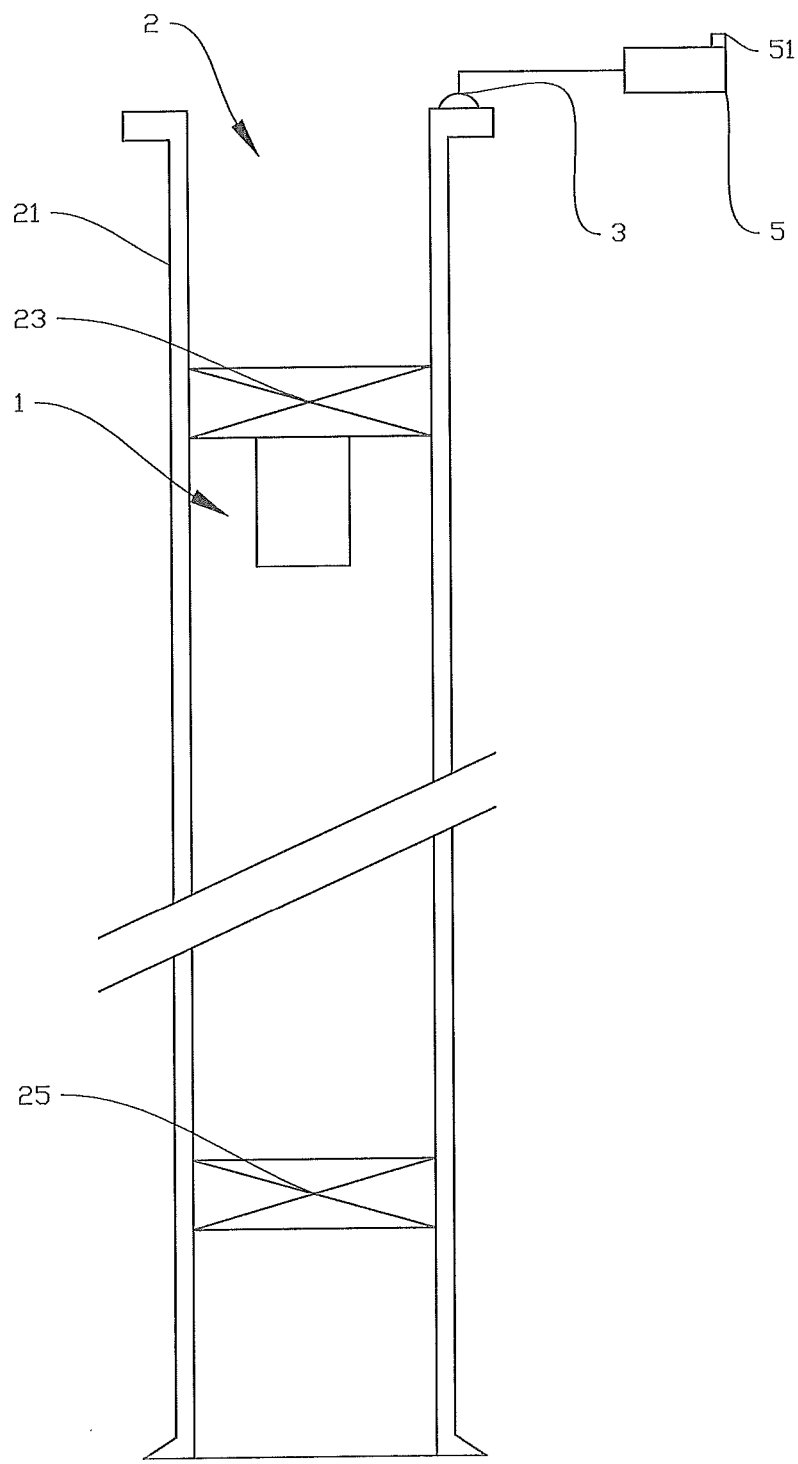
FIG. 1 shows, in a side view, an underground well including a device in accordance with the invention.

In what follows, the reference numeral 1 indicates a pressure-sensing device in accordance with the invention. The figures are shown in a simplified and schematic manner. Like reference numerals indicate like or corresponding elements.

FIG. 1 shows an underground petroleum well 2, in which a pressure-sensing device 1 in accordance with the invention is placed. The well 2 is temporarily shut in by means of two plugs 23, 25 in the form of packer elements. The packer elements 23, 25, which may be of types known per se, constitute two barrier elements in a well barrier which is to prevent an undesired flow of fluids out of the well 2. The pressure-sensing device 1 is attached to the upper packer element 23, and is thus in a space between the two packer elements 23, 25 in the well 2. The distance between the two packer elements 23, 25 may be several kilometers. The pressure sensing device 1 may be attached to the upper packer element 23 by means of threaded connections not shown or by means of other solutions known per se. In an alternative embodiment, the pressure-sensing device 1 may be integrated in the packer element 23.

Figure 2:
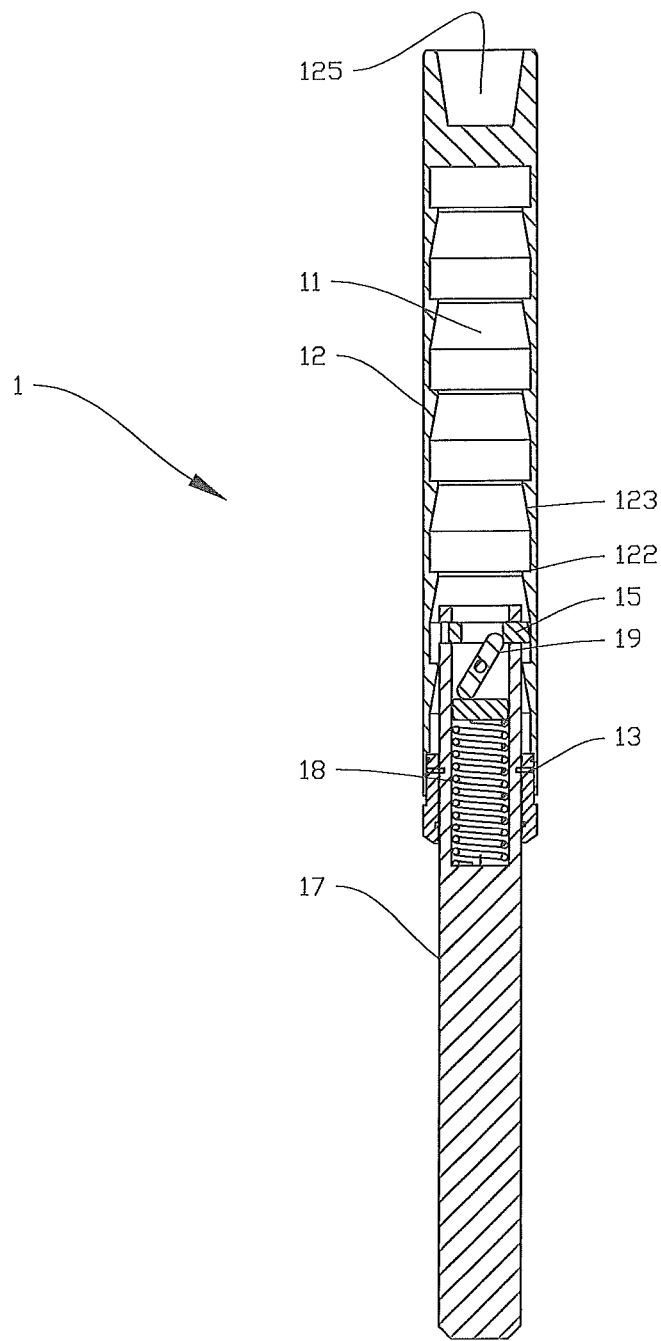
FIG. 2 shows, in a side view and on a larger scale than FIG. 1, a device in accordance with a first embodiment of the invention.
Figure 3:
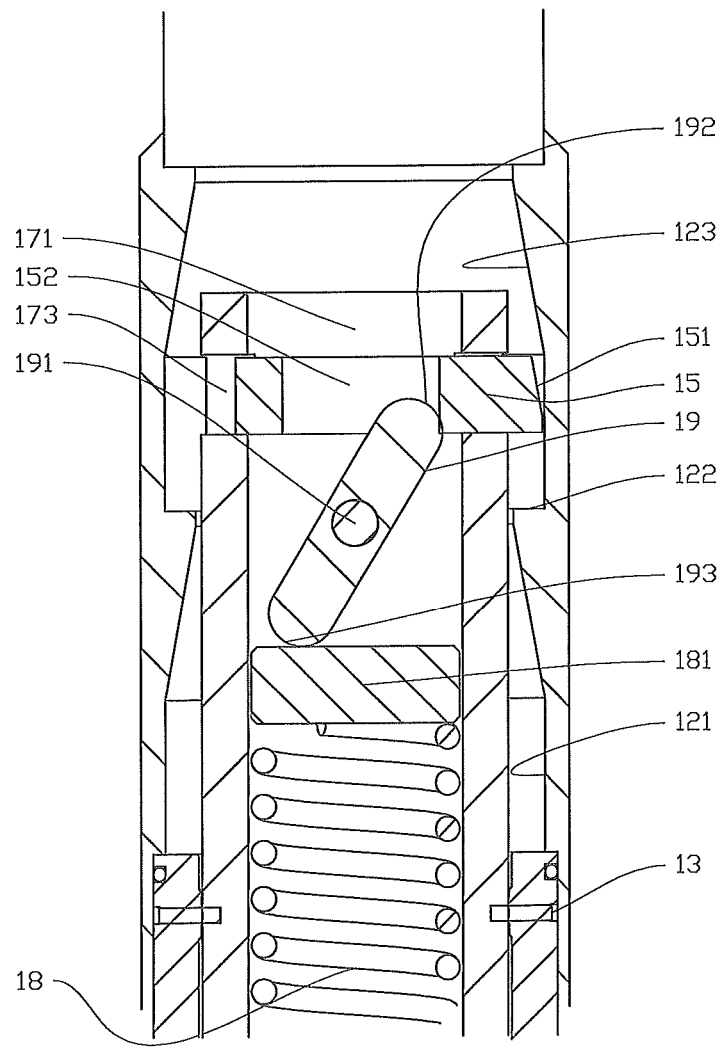
FIG. 3 shows, in a side view, an enlarged portion of the device of FIG. 2.

Reference is now made to FIGS. 2 and 3, FIG. 2 showing a first embodiment of a pressure-sensing device 1 in accordance with the present invention, whereas FIG. 3 shows an enlarged portion of the pressure-sensing device 1 of FIG. 2. The pressure-sensing device 1 includes a housing 12 containing a negative-pressure chamber 11 which is sealed off, in terms of fluid, from the surrounding well 2 by a piston 17 engaging an internal wall 121 of the housing 12. The seal between the piston 17 and the housing 12 may be improved further by means of sealing elements, not shown, of types known per se. As defined in the description above, the term "negative-pressure" in the negative-pressure chamber 11 is meant to describe the relative pressure difference between the negative-pressure chamber 11 and the surrounding well 2. The piston 17 is held in place by means of a plurality of mechanical pressure sensors 13 in the form of shear pins. The shear pins 13 are designed to withstand pressure differences between the negative-pressure chamber 11 and the surrounding well 2 up to a predefined limit. By a pressure increase in the well 2 between the two packer elements 23, 25 exceeding said predefined limit, the shear pins 13 will break. The piston 17 is thus released and forced upwards in the negative-pressure chamber 11 by the pressure difference. As it can best be seen from FIG. 3, the piston 17 is formed, in its upper portion, with a cavity 171 containing a compression spring 28 pushing, via an intermediate plate 181, on a swivel arm 19 rotatable around an axle 191 attached to the piston 17. The housing 12 is formed with internal shoulders 122, the shoulders 122 being interconnected by ramps 123 sloping radially inwards from a shoulder 122 and ending abruptly at an overlying shoulder 122. A signal generator 15 in the form of a percussion device is displaceable in a radial bore 173 in the piston 17, the radial bore 173 extending through the cavity 171 above the compression spring 18 as well. The percussion device 15 is formed with a slanted end surface 151 complementarily fitting the ramps 123. Further, the percussion device 15 is formed with a central cut-out 152 extending radially through it, wherein a first end 192 of the swivel arm 19 is in engagement with the percussion device 15 on the inside of the cut-out 152. When the piston 17 is moved axially upwards in the negative-pressure chamber 11, the slanted end surface 151 of the percussion device 15 is pressed against a first ramp 123 and is thus displaced radially inwards. The radial movement of the percussion device 15 causes the swivel arm 19 to be rotated around the axle 191 so that a second end 193 of the swivel arm 19 compresses the compression spring 18 further. As, by the axial displacement of the piston 17 in the negative-pressure chamber 11, the percussion device 15 reaches an overlying shoulder 121, the compressed spring 18 gets to release its potential energy so that, via the intermediate plate 181 and the swivel arm 19, the percussion device 15 is knocked against the housing 12 above the shoulder 122. This course of events repeats itself a number of times corresponding to the number of shoulders 122 in the housing 12. The knocking of the percussion device 15 generates an acoustic signal in the housing 12. The acoustic signal spreads further to a pipe body 21 via the packer element 23. The pipe body 21, which will typically be provided in steel, carries the acoustic signal up to a surface where an acoustic signal sensor 3, connected to the pipe body 21, senses the acoustic signals generated. The sensed signals are forwarded to a control unit 5 including an acoustic signal converter 51 arranged to convert the acoustic signals into an easily readable signal. The acoustic signal generated by means of this first embodiment could form a unique and easily recognizable acoustic signal. The control unit 5 may, for example, be connected to an alarm device, not shown, which is set off on detection of the recognizable acoustic signal, which will then be an indication of an undesired pressure increase in the well 2 in the space between the two packer elements 23, 25. This may be, for example, an indication of the lower packer element 25 having failed. The reference numeral 125 indicates a cut-out for connecting the pressure-sensing device 1 to a well body, for example a packer element 23. The cut-out 125 could be formed with threaded connections not shown.

Figure 4:
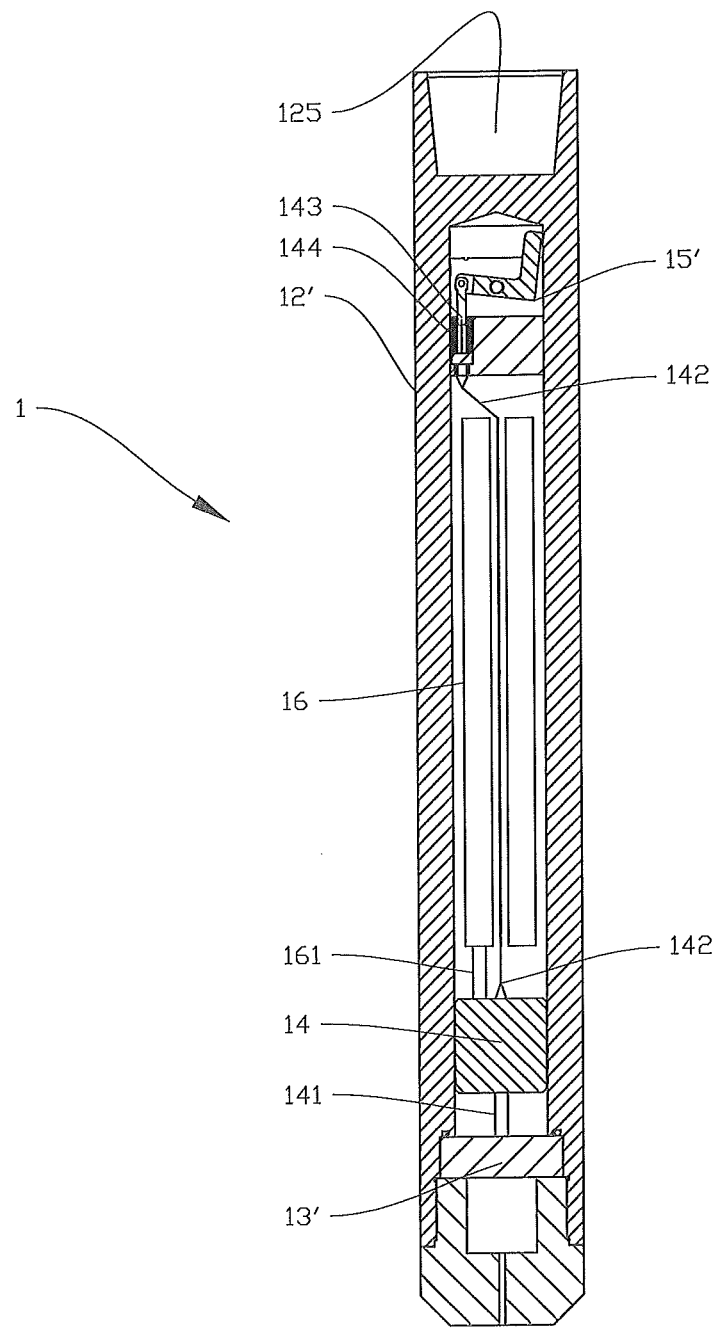
FIG. 4 shows, in a side view, a device in accordance with a second embodiment of the present invention.

FIG. 4 shows a second embodiment of the present invention. The pressure-sensing device 1 includes a pressure sensor 13' which is an electric pressure sensor, and which may be of a kind known per se. The electric pressure sensor 13' is in fluid communication with the surrounding well 2 and is thus arranged to sense the pressure in the well 2. The electric pressure sensor 13' is controlled by an electronic control unit 14 via wires 141, the control unit 14 drawing current from a battery unit 16 via wires 161. If the electric pressure sensor 13' senses a pressure exceeding said limit value, the electric control unit 14 will activate, via wires 142, a signal generator 15', consisting of a percussion device, via a core 143 covered with a solenoid 144 which is controlled by the control unit 14. The percussion device 15' is thus arranged to generate an acoustic signal in a well body, here in the form of a housing 12'. The housing 12' is shown detached, but in a situation of application, it will be attached, directly or indirectly, to a pipe body 21 in a well, so that the acoustic signal generated may propagate up to the surface. The electric pressure sensor 13' in this embodiment could give a more nuanced picture of the pressure situation in the well 2, and different acoustic signals could be generated in response to different pressure levels sensed.

The invention claimed is:

1. A pressure-sensing device for use in an underground well, the pressure-sensing device including:
    a pressure sensor arranged at least to sense whether a pressure in the well is below or above a given limit value;
    a signal generator, in the form of a percussion device, arranged to generate an acoustic signal in a well body in the well in response to a sensed pressure from the pressure sensor exceeding said limit value; and
    a negative-pressure chamber in which the percussion device is positioned, wherein
    the pressure sensor is a mechanical pressure sensor arranged to break when the sensed pressure exceeds said limit value; and
    wherein the pressure-sensing device further includes
    a piston arranged to be released when the mechanical pressure sensor breaks and be driven by a pressure difference between the well and the negative-pressure chamber so that the percussion device will generate the acoustic signal in the well body.

2. The device in accordance with claim 1, wherein the pressure-sensing device further includes a sensor arranged to sense acoustic signals, and the sensor is connected to a control unit including an acoustic signal converter.

3. The device in accordance with claim 1, wherein the mechanical pressure sensor is a shear pin.

4. A method for measuring pressure in an underground well, wherein the method comprises:
    positioning a percussion device in a negative-pressure chamber in the well; and
    by a mechanical pressure sensor, sensing whether the pressure is below or above a given limit value,
    letting the mechanical pressure sensor break when the pressure exceeds said limit value; and
    when the mechanical pressure sensor breaks, letting a piston drift upwards in the negative-pressure chamber because of a pressure difference between the well and the negative-pressure chamber so that the percussion device produces an acoustic signal in a well body in the well.

5. An underground well comprising a pressure sensing device having:
    a pressure sensor arranged at least to sense whether a pressure in the well is below or above a given limit value;
    a signal generator, in the form of a percussion device, arranged to generate an acoustic signal in a well body in the well in response to a sensed pressure from the pressure sensor exceeding said limit value; and
    a negative-pressure chamber in which the percussion device is positioned, wherein
    the pressure sensor is a mechanical pressure sensor arranged to break when the sensed pressure exceeds said limit value; and
    wherein the pressure-sensing device further includes
    a piston arranged to be released when the mechanical pressure sensor breaks and be driven by a pressure difference between the well and the negative-pressure chamber so that the percussion device will generate the acoustic signal in the well body.

6. A barrier element for an underground well provided with a pressure-sensing device comprising
    a pressure sensor arranged at least to sense whether a pressure in the well is below or above a given limit value;
    a signal generator, in the form of a percussion device, arranged to generate an acoustic signal in a well body in the well in response to a sensed pressure from the pressure sensor exceeding said limit value; and
    a negative-pressure chamber in which the percussion device is positioned, wherein
    the pressure sensor is a mechanical pressure sensor arranged to break when the sensed pressure exceeds said limit value; and
    wherein the pressure-sensing device further includes
    a piston arranged to be released when the mechanical pressure sensor breaks and be driven by a pressure difference between the well and the negative-pressure chamber so that the percussion device will generate the acoustic signal in the well body.

* * * * *